Feb. 17, 1942.                R. P. BATTY                2,273,004
                    ANTISKID CHAIN ATTACHING DEVICE
                        Filed Feb. 17, 1941
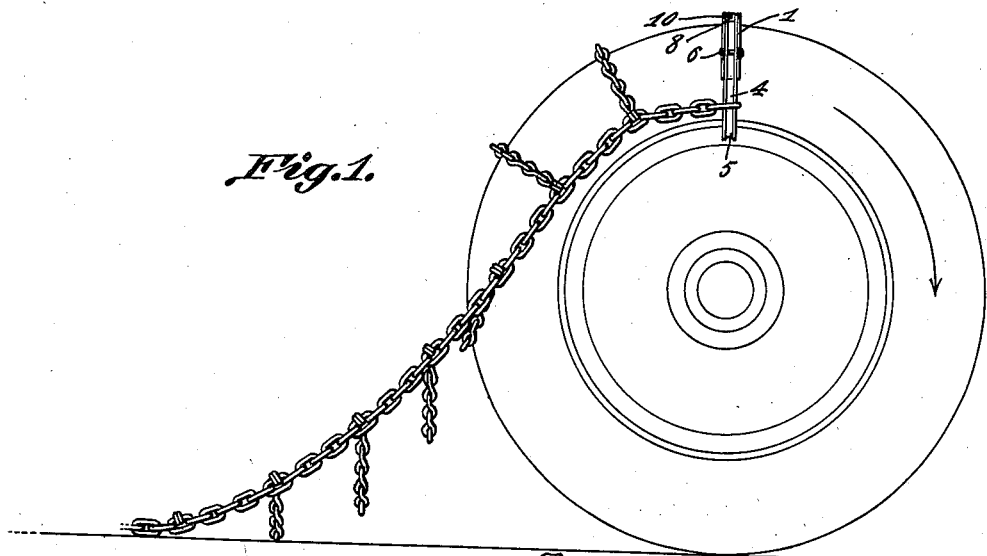
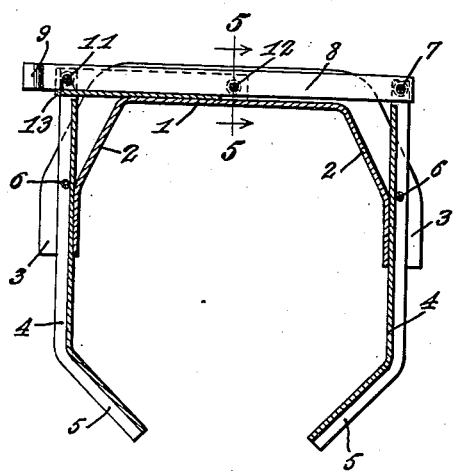
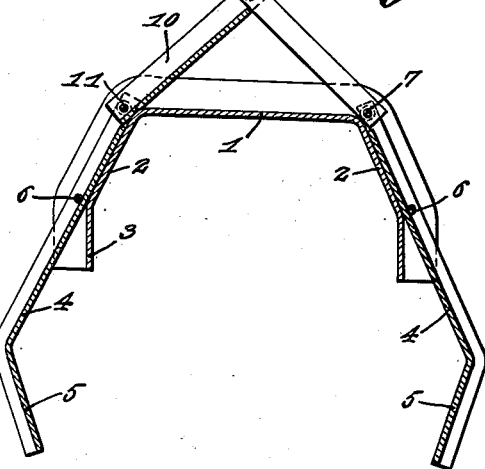
Robert P. Batty, INVENTOR
BY *Victor J. Evans & Co.*
ATTORNEYS Patented Feb. 17, 1942

2,273,004

UNITED STATES PATENT OFFICE 2,273,004

ANTISKID CHAIN ATTACHING DEVICE

Robert P. Batty, Evans City, Pa.

Application February 17, 1941, Serial No. 379,316

2 Claims. (Cl. 81—15.8)

This invention relates to anti-skid chain attaching devices, and its general object is to provide a device that materially facilitates the application of a chain to a vehicle tire, particularly without the use of a jack, in that the device acts to hold one end of the chain fixed relative to the tire, so that when the wheel is rotated, the chain is wrapped about the tire to allow the opposite ends of the chain to be fastened together in the usual manner.

A further object is to provide an anti-skid chain attaching device that can be readily applied and removed with respect to the tire and to the chain, yet casual removal or displacement is practically impossible and the device is simple in construction, inexpensive to manufacture and extremely efficient in operation, use and service.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Figure 1 is a side elevation illustrating my device in use.

Figure 2 is a vertical sectional view taken through the device in closed or tire and rim engaging position.

Figure 3 is a similar view with the device in open position.

Figure 4 is a top plan view of Figure 2.

Figure 5 is a sectional view taken approximately on line 5—5 of Figure 2, looking in the direction of the arrows.

Referring to the drawing in detail, it will be noted that my device includes a marginal flanged substantially U-shaped body 1 of U-form in cross section to provide the channel configuration, as best shown in Figure 5, and the arms of the body are outwardly flared from their connection with the bight portion, in angular formation to provide inclined inner portions 2 and parallel outer portions 3, as clearly shown in Figures 2 and 3.

Pivotally secured to the arms at the juncture of the inclined portions 2 with the parallel portions 3 are clamping jaw members that include shank portions 4 and outer rim engaging and chain receiving portions 5, the latter being disposed at an inward angle toward each other from the shank portions. The jaw members are likewise of flanged channel formation, but are of a width to fit between the flanges of the body, and the pivot pins 6 of the jaw members are mounted in the flanges of the body and extend through the flanges of the jaw members slightly beyond the transverse centers of the shank portions. By that construction, it will be seen that the shank portions are mounted in the channels of the arms for swinging movement and when the jaw members are in their closed position of Figure 2, the shank portions are seated in and engage the parallel portions 3, and when in the open position of Figure 3, they are seated in and engage the inclined portions 2.

Pivotally connected to the inner end of the shank portion of one jaw member by a pivot pin 7 that bridges and is mounted in the flanges thereof, is one end of a hand lever 8 in the form of a strip that has its opposite or free end rolled upon itself to provide finger gripping means 9, and a flanged channel link 10 has one end pivoted by a pin 11 to the inner end of the other jaw member, while the opposite end of the link is pivoted as at 12 to the lever 8 substantially midway its ends, as best shown in Figure 3. The ends of the shank portions that have the lever and the link pivotally connected thereto and the end of the link that is pivotally connected to the lever, are cut away to allow free movement of the parts between the flanges thereof. The lever is provided with a notch 13 adjacent to its free end to receive the pivot pin 11, so that the lever is seated in the channels of the link and bight portion of the body, as best shown in Figure 4, when the jaw members are in clamping position and they are held accordingly, due to the arrangement of the pivots 7, 11 and 12 which when the lever is seated, the center pivot 12 is slightly below the pivots 7 and 11, to set up a toggle or binding action against the jaws to prevent casual movement thereof to open position, as will be apparent upon inspection of Figure 2.

From the above description and the disclosure in the drawing, it is believed that the use of my device will be obvious, but it might be mentioned that when it is desired to apply an anti-skid chain to a tire, the end links at one of the ends of the side chains are mounted on the portions 5 of the jaw members, for disposal at the juncture thereof with the shank portions 4, as shown in Figure 1. The device is then applied in open position to the tire and is closed by the lever 8 for disposing the jaw members in clamping association with the tire and the rim. The wheel is then rotated in the direction of the arrow of Figure 1 for wrapping the chain about the tire, to allow the opposite ends of the side chains to be connected together in the usual manner. The lever is then released to allow the jaws to move to open position and the device is then removed from the chain and tire, and finally the chain ends are connected together.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. A device to facilitate attaching an anti-skid chain to a vehicle tire, comprising a substantially U-shaped channeled body for disposal transversely about the tire, a pair of jaw members including shank portions pivoted between their ends to the arms of the body for movement of the jaw members toward and away from each other, chain receiving end portions formed on the shank portions and bent toward each other for engagement with the rim of the tire, a hand lever having one end pivoted to one shank portion, a channeled link having its ends pivoted to the other shank portion and between the ends of the lever respectively for cooperation with the latter to move the jaw members into and out of clamping relation with respect to the tire and rim, said lever having a notch therein for receiving the pivot connecting the link to its shank portion, the pivot connecting the link to the lever being arranged with respect to the pivots connecting the link and lever to the shank portions for holding the jaw members in clamping position, and said lever being seated in the channels of the link and bight portion of the body when the jaws are in clamping position.

2. A device to facilitate attaching an anti-skid chain to a vehicle tire, comprising a substantially U-shaped channeled body for disposal transversely about the tire, the arms of the body having inner portions inclined outwardly from the bight portion of the body and parallel outer portions formed on the inclined portions, a pair of jaw members including shank portions pivoted between their ends to the arms substantially at the juncture of said inclined and parallel portions for movement of the jaw members toward and away from each other, said jaw members being engageable with the outer faces of the parallel portions when moved toward each other, chain receiving portions formed on the shank portions and bent toward each other for engagement with the rim of the tire, a hand lever having one end pivoted to one shank portion and terminating at its opposite end into finger gripping means, a channeled link having its ends pivoted to the other shank portion and substantially midway between the ends of the lever respectively for cooperation with the latter to move the jaw members into and out of clamping engagement with respect to the tire and rim, said lever having a notch therein for receiving the pivot connecting the link to its shank portion, the pivot connecting the link to the lever being arranged with respect to the pivots connecting the link and lever to the shank portions for holding the jaw members in clamping position, and said lever being mounted in the channels of the link and said bight portion when the jaws are in clamping position.

ROBERT P. BATTY.